(12) United States Patent
Pattok et al.

(10) Patent No.: US 10,836,421 B2
(45) Date of Patent: Nov. 17, 2020

(54) STEERING SYSTEM

(71) Applicant: STEERING SOLUTIONS IP HOLDING CORPORATION, Saginaw, MI (US)

(72) Inventors: Eric D. Pattok, Frankenmuth, MI (US); Sai Saagar Adimulam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 178 days.

(21) Appl. No.: 16/006,215

(22) Filed: Jun. 12, 2018

(65) Prior Publication Data
US 2018/0354547 A1    Dec. 13, 2018

Related U.S. Application Data

(60) Provisional application No. 62/518,110, filed on Jun. 12, 2017.

(51) Int. Cl.
| | |
|---|---|
| *B62D 5/04* | (2006.01) |
| *B62D 7/14* | (2006.01) |
| *F16H 25/20* | (2006.01) |
| *B62D 7/06* | (2006.01) |
| *B62D 7/20* | (2006.01) |
| *B60G 7/00* | (2006.01) |

(52) U.S. Cl.
CPC .......... *B62D 5/0445* (2013.01); *B60G 7/001* (2013.01); *B60G 7/003* (2013.01); *B62D 5/0418* (2013.01); *B62D 7/06* (2013.01); *B62D 7/14* (2013.01); *B62D 7/20* (2013.01); *F16H 25/20* (2013.01); *B60G 2200/44* (2013.01); *B60G 2206/11* (2013.01); *B60G 2206/1116* (2013.01); *F16H 2025/2043* (2013.01); *F16H 2025/2075* (2013.01)

(58) Field of Classification Search
CPC ...... B62D 5/0445; B62D 5/0418; B62D 7/06; B62D 7/14; B62D 7/146
USPC ......................................... 180/445
See application file for complete search history.

(56) References Cited

U.S. PATENT DOCUMENTS

| | | | | |
|---|---|---|---|---|
| 5,078,018 A | * | 1/1992 | Saita ............... | B62D 7/1545 180/445 |
| 5,086,861 A | * | 2/1992 | Peterson .......... | B62D 7/1581 180/445 |
| 5,289,891 A | * | 3/1994 | Sugiyama ........ | B62D 7/1581 180/412 |
| 6,039,143 A | * | 3/2000 | Kielar .............. | B62D 5/0421 180/253 |
| 6,519,518 B1 | * | 2/2003 | Klein ............... | B62D 7/148 180/404 |

(Continued)

*Primary Examiner* — Tony H Winner
(74) *Attorney, Agent, or Firm* — Dickinson Wright PLLC

(57) ABSTRACT

A steering system includes a tie rod and an actuator assembly. The tie rod is movably disposed within a tie rod housing. The actuator assembly includes a first member and a second member. The first member extends from an actuator. The second member has a second member first end operatively connected to the first member and a second member second end operatively connected to the tie rod. The second member first end is arranged to translate the tie rod along a first axis responsive to the actuator moving the second member first end relative to a second axis.

17 Claims, 3 Drawing Sheets

(56) References Cited

U.S. PATENT DOCUMENTS

| | | | | |
|---|---|---|---|---|
| 8,607,920 B2 * | 12/2013 | Jungbecker | ............ | B60G 7/006 180/412 |
| 2008/0157490 A1 * | 7/2008 | Hakui | .................... | B60G 7/006 280/5.521 |
| 2009/0057050 A1 * | 3/2009 | Shiino | .................... | B60G 7/006 180/412 |
| 2016/0311463 A1 * | 10/2016 | Morinaga | ............... | F16H 37/12 |

* cited by examiner

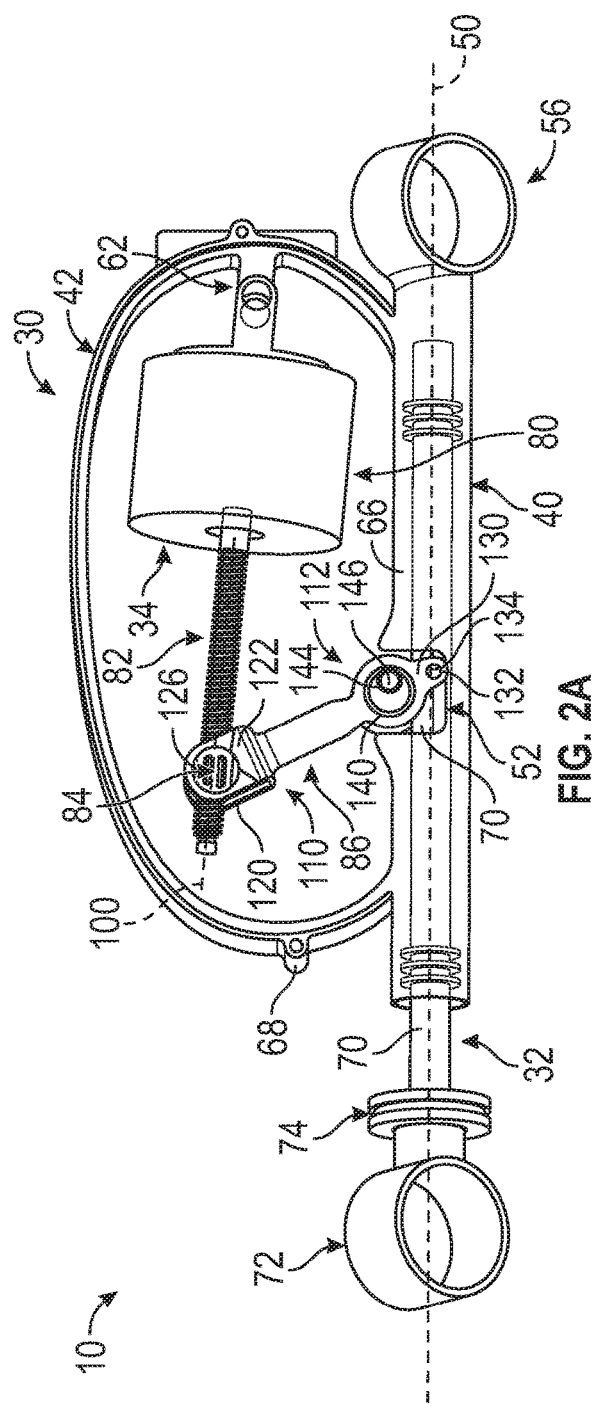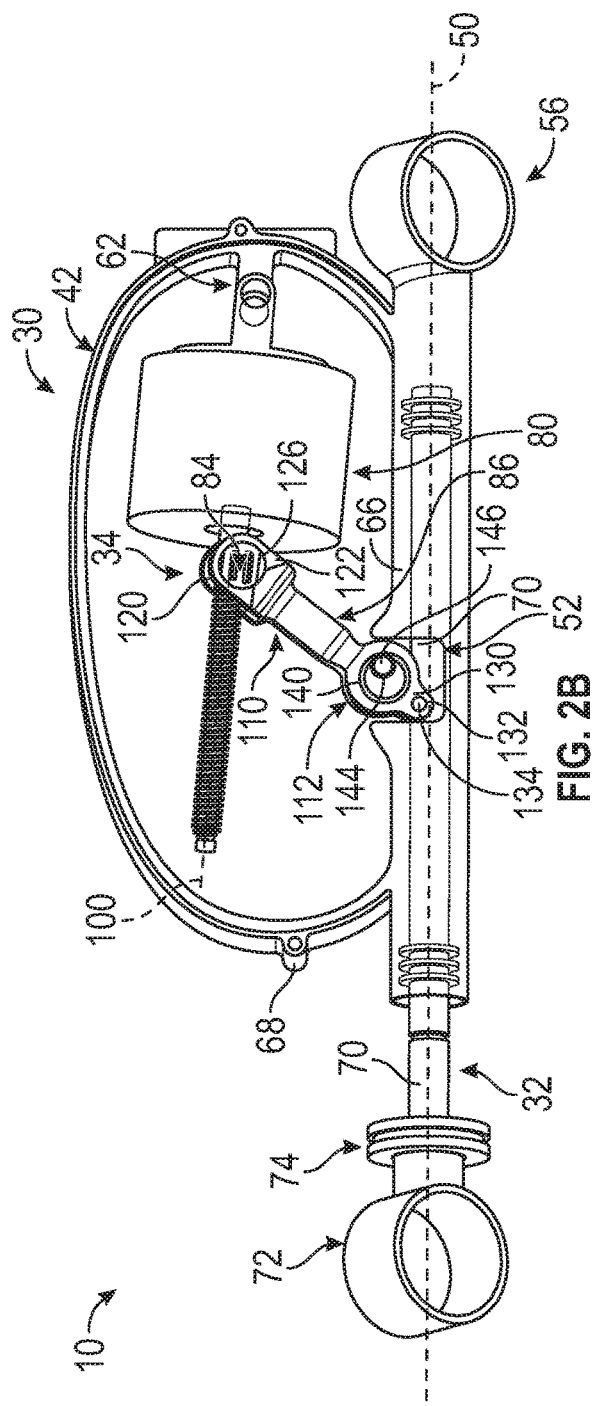

STEERING SYSTEM

CROSS-REFERENCES TO RELATED APPLICATIONS

This patent application claims priority to U.S. Provisional Patent Application Ser. No. 62/518,110 filed Jun. 12, 2017, which is incorporated herein by reference in its entirety.

BACKGROUND

Vehicles are typically supported on wheels for movement along a surface. Typically at least one front vehicle wheel is steerable while the rear vehicle wheels remain in a fixed orientation. Some vehicles are capable of steering at least one rear vehicle wheel to improve vehicle stability by decreasing yaw and/or lateral acceleration.

SUMMARY

According to an embodiment of the present disclosure, a steering system is provided. The steering system includes a tie rod and an actuator assembly. The tie rod extends along a first axis and is movably disposed within a tie rod housing. The actuator assembly is at least partially disposed within an actuator housing that is operatively connected to the tie rod housing. The actuator assembly includes a first member and a second member. The first member extends from an actuator along a second axis. The second member has a second member first end operatively connected to the first member and a second member second end operatively connected to the tie rod. The second member first end is arranged to translate the tie rod along the first axis responsive to the actuator moving the second member first end relative to the second axis.

According to another embodiment of the present disclosure, a steering system is provided. The steering system includes an actuator assembly that is in communication with an advanced driving assist system. The actuator assembly is operatively connected to an actuator housing and includes a first member, a driven member, and a second member. The first member extends from an actuator. The driven member is disposed about the first member. The second member has a second member first end that is operatively connected to the driven member and a second member second end that is operatively connected to a tie rod.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2A is a perspective view of the steering system in a first position;

FIG. 2B is a perspective view of the steering system in a second position.

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A vehicle may be provided with a pair of front wheels and a pair of rear wheels. At least one of the pair of front wheels and the pair of rear wheels is arranged to be articulated by a steering system 10 such that the steering system 10 may be a front wheel steering system and/or a rear wheel steering system. Each wheel of the vehicle may be independently steered by the steering system 10, such that individual steering systems may be associated with each wheel of the vehicle. The steering or articulation of the front wheels and rear wheels (e.g. four wheel steering system) of the vehicle by the steering system 10 improves maneuverability and stability of the vehicle. For example, the steering system 10 may improve evasive maneuvering, improve accident avoidance capabilities, improve performance of various vehicle maneuvers such as parking, provide high-speed lane change stability and control, and reduce vehicle or trailer sway at higher vehicle speeds.

The steering system 10 may articulate or pivot a front wheel and/or a rear wheel responsive to an operator input provided to a hand wheel or an automated/autonomous input provided to the steering system 10. The autonomous input to the steering system 10 may be provided by an advanced driving assist system (ADAS) 20. The ADAS 20 is in operative communication with the steering system 10 to operate the vehicle such that the vehicle is arranged to perform operations without continuous input from a driver (e.g. steering, accelerating, braking, maneuvering, turning, etc.), while operating in an autonomous mode or performing autonomous maneuvers/actions.

The ADAS 20 enables the front wheels or the rear wheels of the vehicle to be pivoted or articulated without operator input, based on inputs received from a vehicle safety system, a global positioning system, a mapping system, a traffic notification system, or a monitoring system such that the vehicle may be an autonomous vehicle, a semi-autonomous vehicle, an autonomously driven vehicle, a selectively autonomous vehicle, a vehicle capable of performing controlled autonomous movements, or the like.

Figure 1:
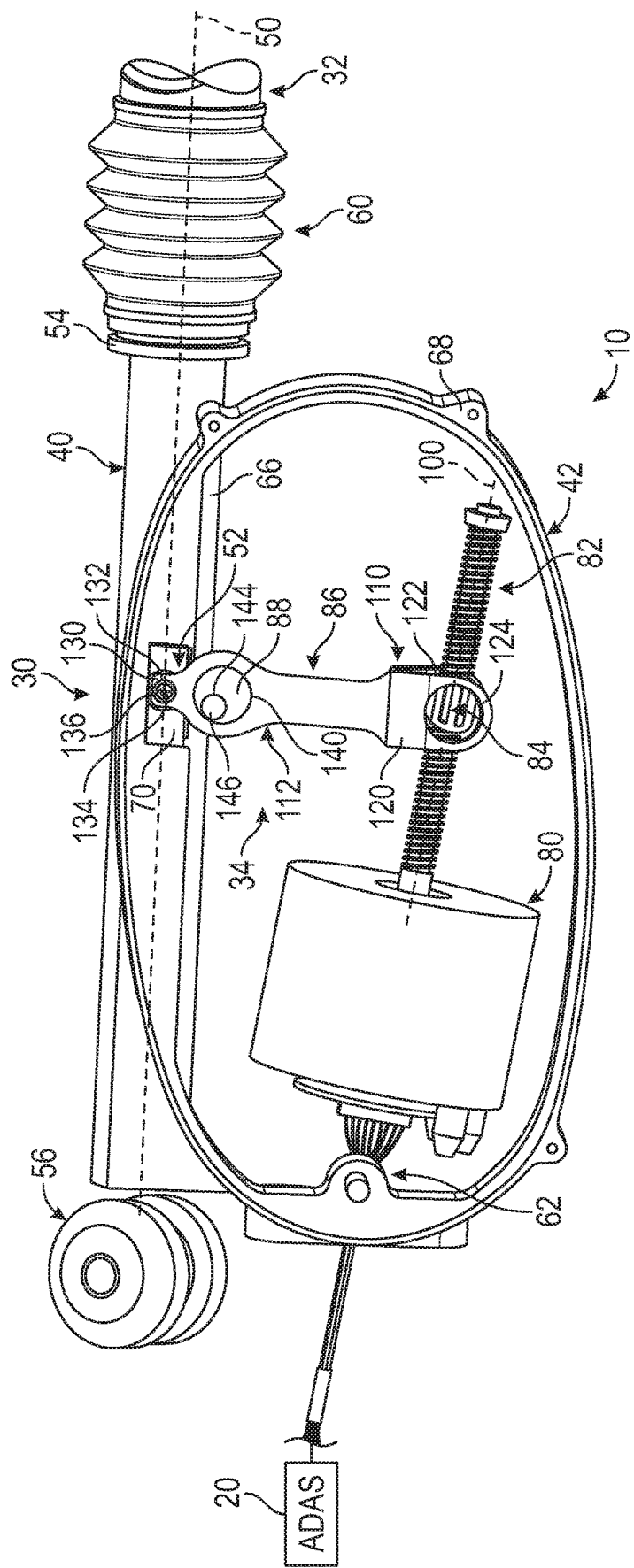
FIG. 1 is a perspective view of a steering system.
Figure 3:
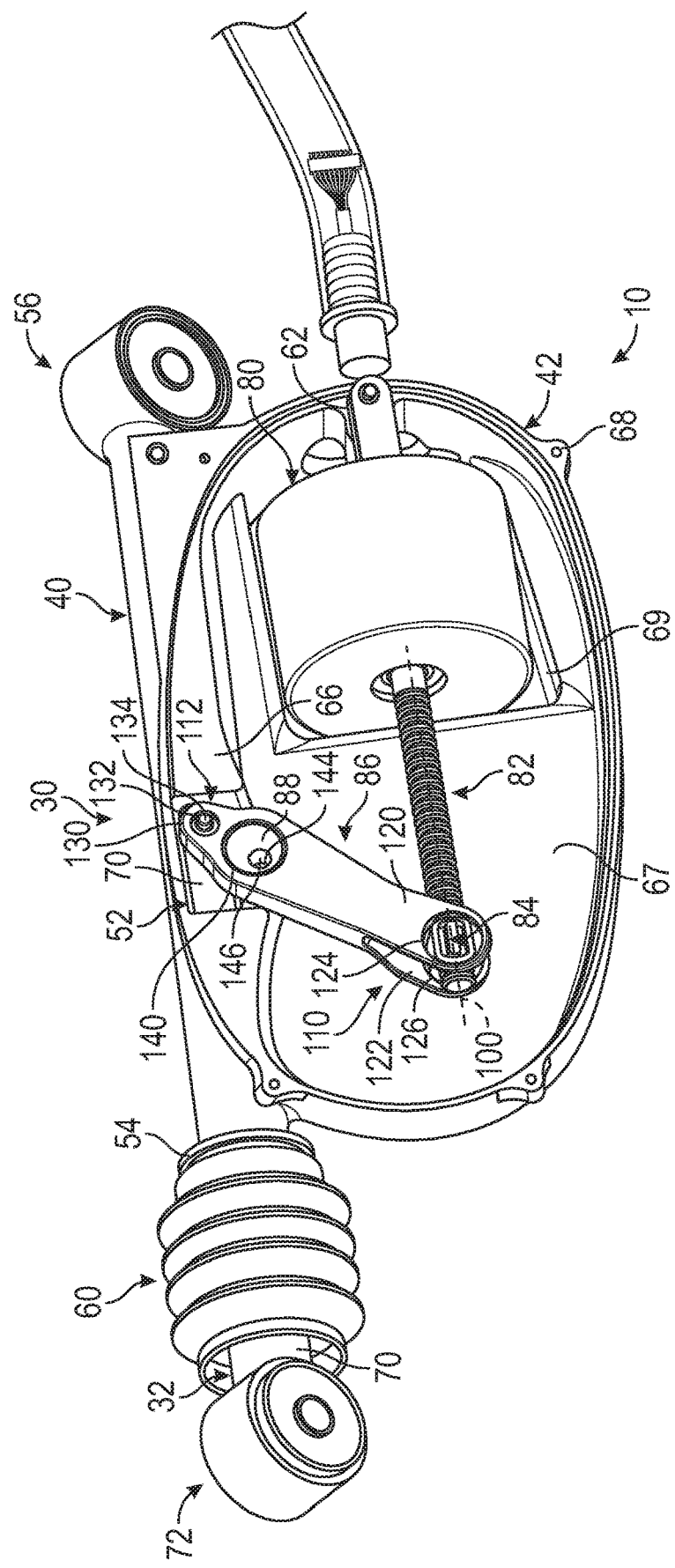
FIG. 3 is a perspective view of a steering system.

Referring to FIGS. 1-3, the steering system 10 may be secured to the vehicle body or vehicle frame and employs a multi-linkage arrangement to pivot at least one of a front wheel and/or a rear wheel responsive to the input provided by an operator of the vehicle or the ADAS 20. The steering system 10 may enable at least one front vehicle wheel and at least one rear vehicle wheel to be steered together or steered independently of one another.

The multi-linkage arrangement employed by the steering system 10, eases packaging of the system into a vehicle, decreases the number of parts involved, reduces the complexity of manufacturing, and significantly reduces costs of the overall steering system. Furthermore, the lack of a gear tooth profile of a geared mechanism reduces overall system lash.

The steering system 10 includes a housing assembly 30, a tie rod 32, and an actuator assembly 34.

The housing assembly 30 includes a tie rod housing 40 and an actuator housing 42 that is operatively connected to the tie rod housing 40.

The tie rod housing 40 extends along a first axis 50. The first axis 50 may be a generally lateral axis of the vehicle along which the tie rod 32 may translate. The tie rod housing 40 is arranged as a hollow elongated member.

The tie rod housing 40 defines an opening 52 that is disposed between distal ends of the tie rod housing 40. The tie rod housing 40 includes a flange 54 disposed at a first distal end of the tie rod housing 40 and a mounting member 56 disposed at a second distal end of the tie rod housing 40 that is disposed opposite the first distal end. The mounting member 56 may be a body mount or the like that facilitates a connection between the steering system 10 and the vehicle.

A flexible boot 60 may be disposed at or about the first distal end of the tie rod housing 40, as shown in FIGS. 1 and 3. The flexible boot 60 may abut the flange 54 and/or may be secured to the flange 54 or directly to the tie rod housing 40.

The actuator housing 42 is operatively connected to the tie rod housing 40. The actuator housing 42 is arranged to receive the actuator assembly 34. The actuator housing 42 includes a mounting feature 62, a mounting lip 66, and an ear 68.

The mounting feature 62 is arranged to facilitate movement (e.g. pivotal movement or rotational movement) of a portion of the actuator assembly 34 relative to the actuator housing 42. The mounting feature 62 is disposed within an interior of the actuator housing 42.

The mounting lip 66 is disposed within an interior of the actuator housing 42. The mounting lip 66 is disposed proximate the opening 52 of the tie rod housing 40. The opening 52 extends through the mounting lip 66. In at least one embodiment, the mounting lip 66 may be defined by the tie rod housing 40 and extend towards an interior of the actuator housing 42. In at least one embodiment, the mounting lip 66 may be defined at a junction between the tie rod housing 40 and the actuator housing 42, proximate the opening 52.

The ear 68 extends from a peripheral wall of the actuator housing 42. The ear 68 is arranged to couple a cover to the actuator housing 42 that seals the actuator housing 42.

In the embodiment shown in FIG. 3, the actuator housing 42 includes a floor plate 67 that is at least partially recessed within the actuator housing 42. The floor plate 67 defines a pocket 69 that is disposed proximate the mounting feature 62.

The tie rod 32 is movably disposed or slidably disposed within the tie rod housing 40. The tie rod 32 may translate relative to the tie rod housing 40 along the first axis 50 responsive to actuation of the actuator assembly 34 to pivot or steer the at least one rear vehicle wheel.

Referring to FIGS. 2A and 2B, the tie rod 32 includes a tie rod body 70 and a tie rod end 72 disposed at a distal end of the tie rod body 70. At least a portion of the tie rod body 70 is exposed, accessible, or engageable by a portion of the actuator assembly 34 through the opening 52 of the tie rod housing 40. The tie rod end 72 is operatively connected to at least one rear vehicle wheel.

The tie rod end 72 is movable between a first position, as shown in FIG. 2A, and a second position, as shown in FIG. 2B. The first position corresponds to a retracted position of the tie rod end 72. The second position corresponds to an extended position of the tie rod end 72. The first position and the second position of the tie rod end 72 correspond to a first position and a second position of the steering system 10 that moves or pivots at least one rear vehicle wheel between a toe-in position and a toe-out position.

The tie rod end 72 includes a boot mounting feature 74 that provides a mounting area for the flexible boot 60. As shown in FIGS. 1 and 3, the flexible boot 60 may extend between the flange 54 of the tie rod housing 40 and the boot mounting feature 74 of the tie rod 32.

The actuator assembly 34 is at least partially disposed within the actuator housing 42 and is operatively connected to the tie rod body 70 of the tie rod 32 through the opening 52 of the tie rod housing 40. The actuator assembly 34 is in operative communication with the ADAS 20. The actuator assembly 34 includes an actuator 80, a first member 82, a driven member 84, a second member 86, and a bushing 88. The actuator assembly 34 at least partially defines the multiple linkages of the steering system 10.

The actuator 80 is disposed within the actuator housing 42. The actuator 80 is operatively connected to the mounting feature 62 of the actuator housing 42 through a pivot or a pivot pin. The actuator 80 is arranged to pivot, rotate, or articulate relative to the mounting feature 62 responsive to operation of the actuator 80. In the embodiment shown in FIG. 3, the actuator 80 is at least partially received within the pocket 69 of the floor plate 67.

The actuator 80 may be a motor, a pinion, pulley, or other arrangement that is arranged to actuate, rotate, or otherwise move the first member 82. The actuator 80 is in communication with a vehicle control or and/or the ADAS 20 through a connector having a lead that extends through the actuator housing 42, as shown in FIG. 1, or extends through the actuator housing 42, as shown in FIG. 3. The actuator operates responsive to commands, controls, or signals provided by the vehicle controller and/or the ADAS 20.

The first member 82 extends from the actuator 80 along a second axis 100. The second axis 100 may be disposed in a non-parallel relationship with respect to the first axis 50. The first member 82 may be a lead screw or linkage that may move, rotate, or translate relative to the second axis 100 responsive to operation of the actuator 80.

The driven member 84 is disposed about the first member 82. The driven member 84 may be a lead nut that translates along the second axis 100 of the first member 82 responsive to actuation of the first member 82.

The second member 86 extends between and is operatively connected to the first member 82 and the tie rod 32. The second member 86 may be configured as a crank, lever, or the like, having a second member first end 110 and a second member second end 112.

The second member first end 110 is operatively connected to the first member 82 through the driven member 84. The second member first end 110 is arranged as a forked member having a first fork 120 and a second fork 122. The driven member 84 is disposed between the first fork 120 and the second fork 122 and facilitates the movement of the second member 86 relative to the first member 82. The first fork 120 may define a first fork opening 124 through which at least a portion of the driven member 84 extends or is exposed. The second fork 122 defines a second fork opening 126 through which at least a portion of the driven member 84 extends or is exposed.

The driven member 84 has a rotational sliding fit within the first fork 120 and the second fork 122 of the second member first end 110. The rotational sliding fit facilitates a certain degree of freedom to rotate or move within or between the first fork 120 and the second fork 122 of the second member first end 110 as the first member 82 is actuated.

The driven member 84 is disposed proximate an end of the first member 82 and the second member 86 is disposed at a first angle with respect to the first member 82 or the tie rod housing 40 while the tie rod end 72 is in the first position, as shown in FIG. 2A. The driven member 84 is disposed proximate the actuator 80 and the second member 86 is disposed at a second angle, that is different than the first angle, with respect to the first member 82 or the tie rod housing 40 while the tie rod end 72 is in the second position, as shown in FIG. 2B.

The second member second end 112 is operatively connected to the tie rod body 70 of the tie rod 32 and/or the mounting lip 66 of the tie rod housing 40 or the actuator housing 42. The second member second end 112 includes a tab or finger 130 that extends away from the second member second end 112. The finger 130 of the second member second end 112 extends towards the tie rod 32. The finger 130 extends into or towards the opening 52 of the tie rod housing 40.

The finger 130 defines a first opening 132 that receives a first pin 134. The first pin 134 extends through the finger 130 of the second member second end 112 and extends into the tie rod body 70 of the tie rod 32 along a third axis 136 to connect the second member 86 to the tie rod 32. The third axis 136 is disposed transverse to the first axis 50 and the second axis 100.

The second member second end 112 defines a second opening 140 that is spaced apart from the first opening 132 of the finger 130. The second opening 140 is arranged to receive a bushing 88, such as an eccentric bushing.

The bushing 88 defines a bushing opening 144 that receives a second pin 146. The bushing opening 144 is offset from a centerline of the bushing 88 as shown in the figures. The second pin 146 extends through the bushing opening 144 of the bushing 88 and extends into the mounting lip 66 of at least one of the tie rod housing 40 and/or the actuator housing 42. The offsetting of the second pin 146 due to the position of the bushing opening 144 causes the second pin 146 to act as a fulcrum.

The eccentricity of the bushing 88 and the offsetting of the second pin 146 within the bushing 88 facilitates the rocking of the second member 86, enabling the first pin 134 and the second member second end 112 of the second member 86 to perform nonlinear motion or complex motion, responsive to actuation of the actuator 80 and the first member 82, to translate the tie rod 32 between the first position and the second position along the first axis 50 to steer or move at least one rear vehicle wheel.

In at least one embodiment, the second member second end 112 and the bushing 88 may be replaced with an additional linkage. The additional linkage may be operatively connected to the tie rod 32 through the opening 52 and may be operatively connected to the second member 86. The additional linkage may be pivotally connected to the second member 86 to facilitate the complex motion of the end of the additional linkage to translate the tie rod 32 along the first axis 50.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the invention, it is claimed:

1. A steering system, comprising:
a tie rod extending along a first axis and is movably disposed within a tie rod housing; and
an actuator assembly at least partially disposed within an actuator housing that is operatively connected to the tie rod housing, the actuator assembly comprising:
a first member extending from an actuator along a second axis, and
a second member having a second member first end operatively connected to the first member and a second member second end operatively connected to the tie rod, the second member first end being arranged to translate the tie rod along the first axis responsive to the actuator moving the second member first end relative to the second axis, wherein the second axis is disposed in a non-parallel relationship with respect to the first axis.

2. The steering system of claim 1, wherein the steering system is a rear wheel steering system.

3. The steering system of claim 1, wherein the tie rod housing defines an opening.

4. The steering system of claim 3, wherein the second member second end extends into the opening.

5. The steering system of claim 1, further comprising a driven member disposed about the first member.

6. The steering system of claim 5, wherein the driven member operatively connects the second member first end to the first member.

7. A steering system, comprising:
a tie rod extending along a first axis and is movably disposed within a tie rod housing; and
an actuator assembly at least partially disposed within an actuator housing that is operatively connected to the tie rod housing, the actuator assembly comprising:
a first member extending from an actuator along a second axis, and
a second member having a second member first end operatively connected to the first member and a second member second end operatively connected to the tie rod, the second member first end being arranged to translate the tie rod along the first axis responsive to the actuator moving the second member first end relative to the second axis, wherein the second member second end defines an opening that is arranged to receive a bushing.

8. The steering system of claim 7, wherein the bushing defines a bushing opening that receives a second pin that extends into at least one of the tie rod housing and the actuator housing.

9. A steering system, comprising:
an actuator assembly in operative communication with an advanced driving assist system, the actuator assembly being operatively connected to an actuator housing, the actuator assembly comprising:
a first member extending from an actuator,
a driven member disposed about the first member, and
a second member having a second member first end that is operatively connected to the driven member and a second member second end that is operatively connected to a tie rod, wherein the second member first end includes a first fork and a second fork.

10. The steering system of claim 9, wherein the steering system is a rear wheel steering system.

11. The steering system of claim 9, wherein the actuator is operatively connected to the actuator housing.

12. The steering system of claim 9, wherein the driven member is disposed between the first fork and the second fork.

13. A steering system, comprising:
   an actuator assembly in operative communication with an advanced driving assist system, the actuator assembly being operatively connected to an actuator housing, the actuator assembly comprising:
   a first member extending from an actuator,
   a driven member disposed about the first member, and
   a second member having a second member first end that is operatively connected to the driven member and a second member second end that is operatively connected to a tie rod, wherein the second member second end includes a finger that extends towards the tie rod, wherein the finger defines a first opening that receives a first pin that extends into the tie rod.

14. The steering system of claim 13, wherein the second member second end defines a second opening that is spaced apart from the first opening.

15. The steering system of claim 14, wherein the second opening receives a bushing.

16. The steering system of claim 15, wherein the bushing defines a bushing opening that is offset from a centerline of the bushing.

17. The steering system of claim 16, wherein the bushing opening receives a second pin that extends into a mounting lip of the actuator housing.

\* \* \* \* \*